United States Patent [19]

Hanke

[11] 4,226,133

[45] Oct. 7, 1980

[54] ADJUSTABLE PULLEY CONSTRUCTION

[76] Inventor: Merlin S. Hanke, 27570 French Creek Rd., Avon, Ohio 44011

[21] Appl. No.: 915,961

[22] Filed: Jun. 15, 1978

[51] Int. Cl.³ ..................... F16H 55/36; F16H 55/52
[52] U.S. Cl. ..................................................... 474/42
[58] Field of Search .......... 74/230.3, 230.8, 230.17 R, 74/230.17 A, 230.17 C, 230.17 M, 230.17 B; 403/362

[56] References Cited

U.S. PATENT DOCUMENTS

| | | | |
|---|---|---|---|
| 1,074,188 | 9/1913 | McGlynn | 403/362 X |
| 2,254,380 | 9/1941 | Mitchell | 74/230.17 C |
| 2,321,438 | 6/1943 | Tyler | 74/230.17 C |
| 2,555,189 | 5/1951 | Fuchslocher | 403/362 X |
| 2,620,675 | 12/1952 | Meadows et al. | 403/362 X |
| 3,034,366 | 5/1962 | Tann | 74/230.17 C |
| 3,043,151 | 7/1962 | Keepers | 74/230.17 C |
| 3,132,529 | 5/1964 | Hauben et al. | 74/230.17 C |
| 3,296,878 | 1/1967 | James et al. | 74/230.17 C |
| 3,611,821 | 10/1971 | Legles | 74/230.17 C |
| 3,624,716 | 11/1971 | Jaeschke | 74/230.17 M |
| 3,661,023 | 5/1972 | Maurey | 74/230.17 B |
| 3,680,404 | 8/1972 | Firth | 74/230.17 C |
| 3,815,432 | 6/1974 | Maurey et al. | 74/230.17 B |
| 3,979,963 | 9/1976 | Goettl | 74/230.17 B |

FOREIGN PATENT DOCUMENTS

| | | | |
|---|---|---|---|
| 872177 | 6/1942 | France | 74/230.17 C |
| 519440 | 3/1940 | United Kingdom | 74/230.17 C |

*Primary Examiner*—Leslie Braun

[57] ABSTRACT

A first pulley disc having an inner tubular-shaped member extending concentrically at right angles from the center of said first disc. The inner hub is formed with an externally threaded annular portion adjacent the disc and a smooth surfaces, cylindrical outer end portion. A pair of diametrically opposed slots is formed in the outer end portion and extend in an axial longitudinal direction toward the threaded portion. A second pulley disc having an outer cylindrical-shaped hub member extending concentrically at right angles from the center of said second disc. The outer hub member has an internally threaded end portion adjacent the second disc and an annular internally recessed outer end portion. A threaded opening extends radially through the outer hub member and into the internal recessed portion. The internally threaded portion of the outer hub is engaged with the externally threaded portion of the inner hub for selectively spacing complementary marginal belt engaging surfaces of the disc. A setscrew is adjustably mounted in the radial opening of the outer hub and extends through the inner hub slots to prevent relative rotation between the inner and outer hubs and discs in order to maintain the discs in their adjusted position while simultaneously clampingly engaging a shaft extending through the inner hub to mount the adjusted pulley on the shaft. The smooth cylindrical outer end portion of the inner hub is telescopically received within an inwardly extending annular outer end flange formed on the outer hub to form a general slip fit engagement therebetween to prevent wobble between the threadedly engaged hubs.

6 Claims, 7 Drawing Figures

ADJUSTABLE PULLEY CONSTRUCTION

BACKGROUND OF THE INVENTION

1. Field of the Invention

The invention relates to pulleys and particularly to a V-belt engaging pulley. More particularly the invention relates to a fixed position, variable pitch pulley which is stronger and more reliable and which can be produced easily and less expensively than similar pulleys, and in which the disc and hub assemblies are threadedly adjustably engaged with each other and are retained in adjusted position and mounted on a shaft by a single setscrew.

2. Description of the Prior Art

Numerous pulleys of the split sheave type for use with a V-belt have been constructed to permit adjustment of the spacing between the belt engaging pulley flanges or discs to adjust the pitch diameter of the pulley and consequently its operating characteristics. There are several general types of variable pitch pulleys. One type is provided with various mechanisms whereby one of the pulley discs is moveably mounted with respect to the other disc and is adjusted automatically by centrifugal forces acting on the pulley components. Another type of adjustable pulley has a moveable disc which is spring biased with respect to a fixed disc whereby the pitch is varied automatically in relationship to various forces acting upon the pulley. Another type is referred to as a fixed position, variable pitch pulley, which type is the subject of my invention. In this pulley type the discs are manually adjusted to a predetermined pitch and then locked or clamped in the selected position by various mechanisms.

Many of the prior fixed position, adjustable pulley constructions require large diameter bar stock from which the hubs were formed in order to provide sufficient strength and rigidity for the pulley discs. This large bar stock requires considerable machining and metal removal to form the threaded areas of the hubs to obtain the adjustment feature.

Also, most known fixed position, adjustable pulleys use two or more setscrews, at least one for adjusting the spacing between the pulley discs and another for securing the pulley on a shaft. Each setscrew requires costly drilling, tapping and reaming operations to be performed on the pulley components, and in many pulley constructions the setscrew will extend through a threaded area of another pulley component requiring deburring of the disturbed threads. In these multiple setscrew arrangements the setscrews are usually located on opposite sides of the pulley groove making it impossible for the pulley pitch to be adjusted in certain applications where the back of the pulley is inaccessible.

Other known fixed position, adjustable pulleys use wedging or clamping elements which are engaged by clamping screws such as shown in U.S. Pat. Nos. 3,132,529, 3,815,432 and 3,979,963. Other examples of related type fixed position pulley constructions are shown in U.S. Pat. Nos. 3,611,821 3,661,023 and 3,680,404.

No known fixed position, adjustable pulley construction of which I am aware has eliminated these problems by a relatively simple and inexpensive construction as set forth below and as defined in the claims.

SUMMARY OF THE INVENTION

Objectives of the invention include providing a fixed position, adjustable pulley construction which is formed from a relatively few inexpensive components, portion of which are joined together to form a pair of hub and disc assemblies which are adjustably connected together by threaded inner and outer hubs to permit numerous positions of adjustment to be achieved between the belt engaging discs, and in which a single setscrew clamps the pulley on a shaft and simultaneously maintains the hub and disc assemblies in a predetermined adjusted position; providing such a pulley construction in which the clamping setscrew extends through unthreaded areas of the hubs eliminating deburring of heretofore effected threaded areas, and in which the setscrew provides both a positive engagement between the adjusted pulley discs to prevent slippage of the adjusted pulley pitch; providing such a pulley construction in which the extended end of the inner or male pulley hub has a smooth, unthreaded surface which can be machined to provide a telescopic slip fit engagement with an unthreaded area of the bore of the outer or female hub to eliminate wobble and chatter between the inner and outer hubs and in which this smooth outer end configuration eliminates the need for extremely close fitting threads throughout the entire area of both the inner and outer hubs as in other pulley constructions and in which threads are expensive and troublesome, and in which the smooth, unthreaded extended end eliminates a threaded portion of the inner pulley hub from projecting beyond the outer hub and subjecting the threads to possible damage during handling, shipping and finishing; and providing such a pulley construction which reduces maintenance and repair problems, which achieves the stated objectives in a simple, effective and inexpensive manner, and which solves problems and satisfies needs presently existing in the art.

These and other objectives and advantages may be obtained by the improved fixed position, adjustable pulley construction, the general nature of which may be stated as including first and second discs means having spaced, outwardly extending complementary belt-engaging surfaces; inner hub means mounted on and extending concentrically from the first disc means, said first disc means and inner hub means being formed with a shaft-receiving bore; the inner hub means being formed with external screw threads and radially extending opening means, said opening means communicating with the bore of said inner hub means; outer hub means mounted on and extending concentrically from the second disc means, said second disc means and outer hub means being formed with a bore axially aligned with the bore of the first disc means and inner hub means; the outer hub means being formed with internal screw threads and radially extending opening means, said opening means communicating with the outer hub means bore; the internal screw threads of the outer hub means being engaged with the external screw threads of the inner hub means to adjustably mount the second disc means on the inner hub means for selectively spacing the belt engaging surfaces of the first and second disc means with respect to each other to receive a V-belt therebetween, said radially extending opening means of the inner and outer hub means being adapted to be in radial alignment with each other when the disc means are in an adjusted position; and means mounted on the outer hub means and adapted to extend through the aligned opening means of the inner and outer hub means and into the bore of the inner hub means to engage a shaft extending through said inner hub means bore to mount the pulley construction on a shaft while simultaneously operatively engaging the inner hub means to prevent relative rotation between the adjusted inner and outer hub means.

BRIEF DESCRIPTION OF THE DRAWINGS

The preferred embodiment of the invention for achieving the objects and advantages set forth above is shown in the accompanying drawings and described below, and is set forth in the claims.

DESCRIPTION OF THE PREFERRED EMBODIMENT

Figure 2:
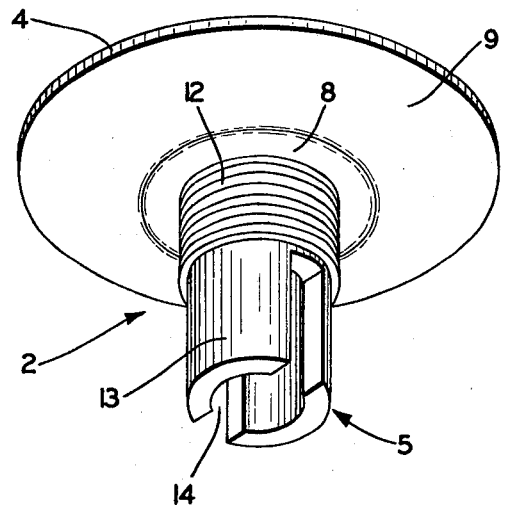
FIG. 2 is a perspective view of an inner hub and disc assembly portion of the improved pulley construction.
Figure 3:
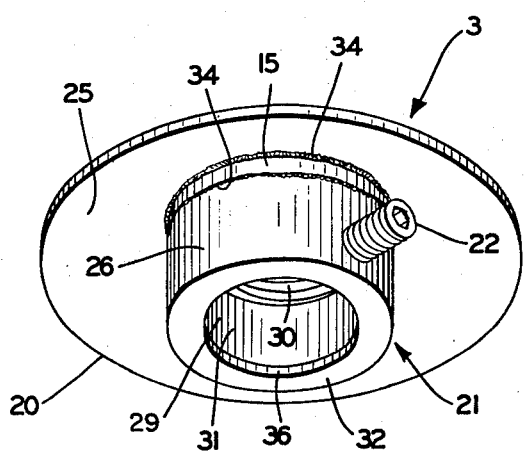
FIG. 3 is a perspective view of an outer hub and disc assembly portion of the improved pulley construction.
Figure 4:
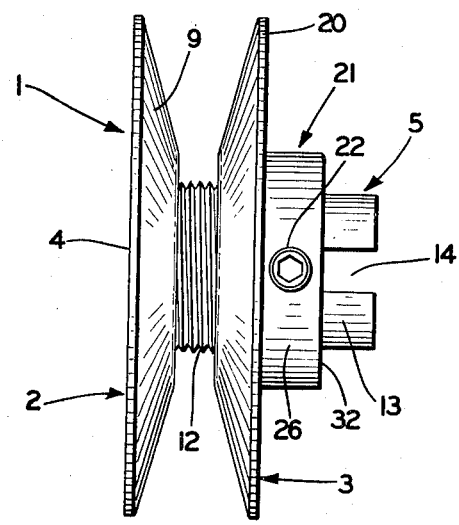
FIG. 4 is an elevational view of the improved pulley construction.
Figure 5:
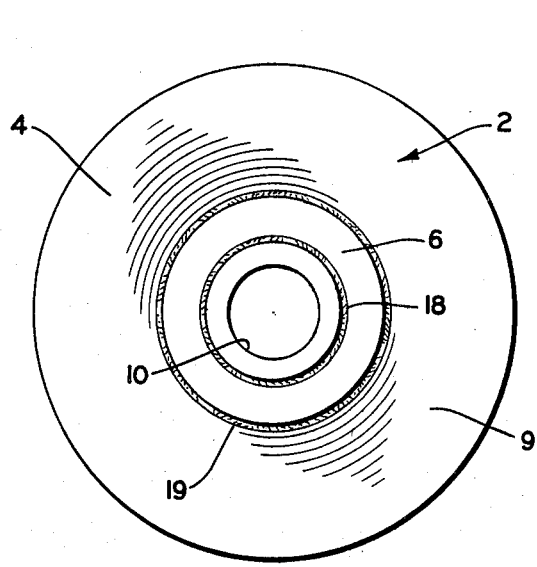
FIG. 5 is a left-hand and elevational view of the improved pulley shown in FIG. 4.

The improved fixed position, variable pitch pulley construction is indicated generally at 1, and is shown particularly in FIG. 4. Pulley construction 1 includes an inner hub and disc assembly indicated generally at 2 (FIG. 2), and an outer hub and disc assembly indicated generally at 3 (FIG. 3).

Figure 1:
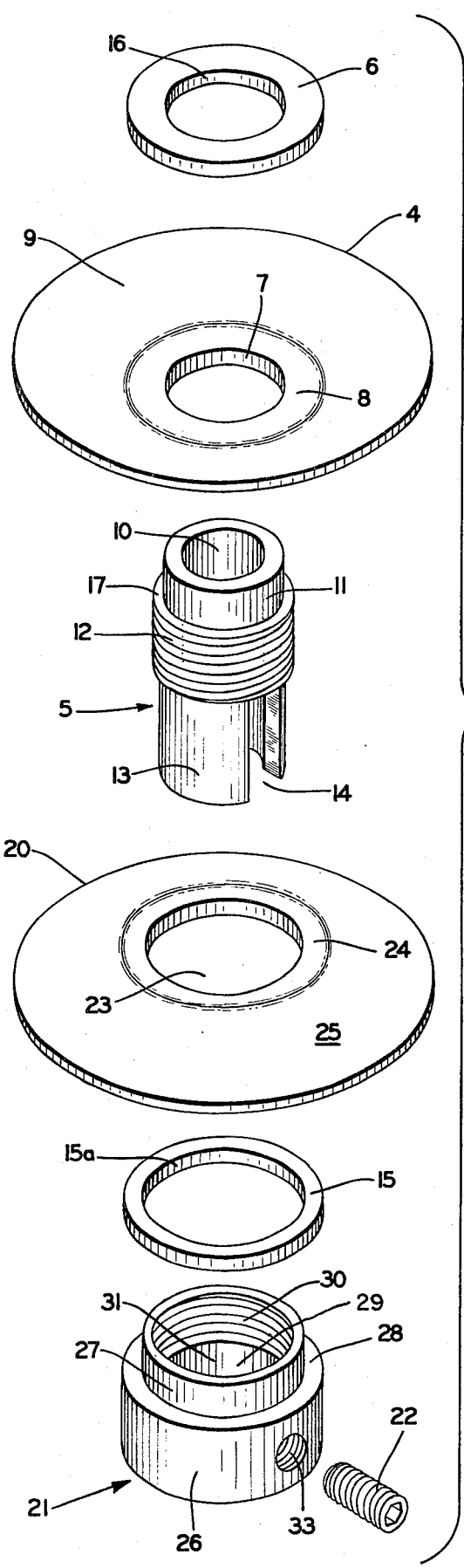
FIG. 1 is an exploded perspective view of the improved fixed position, variable pitch pulley construction.

Pulley construction 1 includes seven component parts which are shown in exploded positions in FIG. 1. Inner hub and disc assembly 2 includes an annular disc 4, a tubular hub 5 and a backup or reinforcing washer 6. Disc 4 is formed with a central opening 7, and includes a flat annular radially extending area 8 which terminates in an annular outwardly extending belt engaging marginal area 9.

Inner hub 5 is formed with a hollow smooth bore 10, a smooth surfaced, cylindrical inner end 11, an intermediate externally threaded area 12, and a smooth surfaced, cylindrical outer end 13 concentric with bore 10. A pair of longitudinally extending diametrically opposed slots 14 are formed in hub end 13 and extend from its open end toward adjacent threaded area 12. End 11 of inner hub 5 extends through disc opening 7 which has a diameter complementary to the outer diameter of end 11.

Washer 6 has an annular configuration and is formed with a central opening 16 which has a diameter complementary to disc opening 7 and the outer diameter of inner hub end 11. Washer 6 is telescopically mounted on end 11 of inner hub 5 which preferably projects beyond disc 4 when mounted thereon (FIG. 7) to clamp disc 4 on hub 5 between washer 6 and an annular shoulder 17 formed at the junction of threaded area 12 and hub end 11. Disc 4, hub 5 and washer 6 preferably are joined by a pair of circular welds or brazed areas 18 and 19 (FIG. 7) or otherwise joined such as by staking hub surface 11 toward threaded area 12 to form an integral inner hub and disc assembly 2.

It is also understood that disc 4, hub 5 and washer 6 can be formed as an integral component by casting, molding or the like combining the physical characteristics brought forth in disc 4, hub 5 and washer 6.

It is further understood that the washers 6 and 15 could be enlarged materially for added strength.

Outer hub and disc assembly 3 includes a disc 20, a backup washer 15, an outer hub 21 and a setscrew 22. Disc 20 is similar to disc 4 and is formed with a central opening 23, and includes a flat annular, radially extending annular area 24 and an outwardly extending belt engaging annular marginal area 25. Washer 15 is similar to washer 6 except it has a larger diameter central opening 15a than opening 16 of washer 6. Outer hub 21 preferably has a cylindrical configuration with a smooth surfaced outer end 26 and a reduced diameter cylindrical-shaped inner end 27 concentric with outer end 26. End 27 is joined to outer end 26 by an annular shoulder 28. Outer hub 21 has an interior bore 29 which is formed with an internally threaded annular inner end area 30, an annular nonthreaded recessed intermediate area 31, and an inwardly extending annular outer end flange 36 (FIG. 3).

A radially extending threaded opening 33 is formed in outer hub end 26 and communicates with hub bore 29 at recessed area 31. Setscrew 22 is threadedly engaged in opening 33 and is adapted to project in and through hub bore 29.

Washer 15 is telescopically mounted on an inner end 27 of outer hub 21 which projects through disc opening 23 with hub shoulder 28 being in abutting clamping engagement with washer 15 and inner area 24 of disc 20. A plurality of circular welds or brazen areas 34 integrally joins outer hub 21, washer 15 and disc 20. Hub 21, washer 15 and disc 20 also may be bonded together by other means such as staking hub surface 27 toward shoulder 28. Also, hub 21, disc 20 and washer 15 can be formed as an integral component by casting, molding or the like combining the physical characteristics brought forth in hub 21, disc 20 and washer 15.

Figure 7:
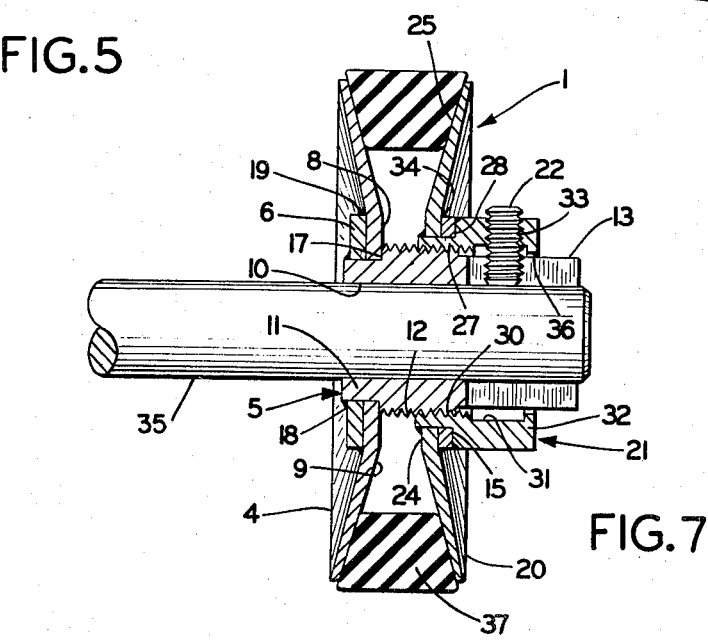
FIG. 7 is a longitudinal sectional view of the pulley construction of FIG. 4 shown mounted on a fragmentary portion of a shaft.

Pulley 1 is shown in assembled condition in FIG. 4 and is shown mounted on a shaft 35 in FIG. 7. Integral hub and disc assemblies 2 and 3 are joined easily by the threaded engagement of the externally threaded area 12 of inner hub 5 with the internally threaded area 30 of outer hub 21. The smooth outer slotted end 13 of inner hub 5 projects through the circular open end 36 of outer hub 20 which is formed by hub flange 32. The diameter of the hub open end 36 is complementary to the diameter of the smooth outer surface of hub end 13 of inner hub 5 so as to provide a slip fit telescopic engagement therebetween. This complementary engagement prevents wobble and chatter of outer hub 21 with respect to inner hub end 13 during rotation of pulley 1 which is not regulated would permit the belt engaging disc surfaces to be out of concentricity with the bore of the pulley.

Figure 6:
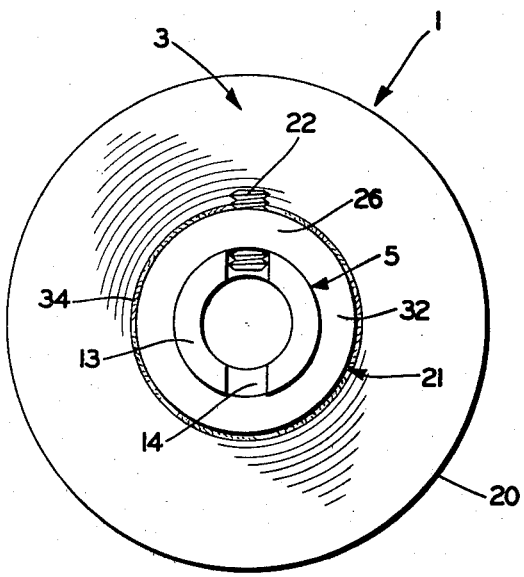
FIG. 6 is a right-hand end elevational view of the improved pulley shown in FIG. 4.

Outer hub and disc assembly 3 is rotatably advanced along threaded area 12 of inner hub and disc assembly 2 until the desired axial separation or spacing is achieved between the belt engaging disc surfaces 9 and 25. Setscrew 22 then is advanced sufficiently inwardly in its opening 33 until it extends through an aligned slot 14 of inner hub 5 and clampingly engages shaft 35 (FIG. 7). The outer diameter of setscrew 22 is complementary to the width of slots 14 (FIG. 6) so it will pass there-through without damaging the screw threads, yet prevent rotational movement of inner hub 5 with respect to outer hub 21.

Single setscrew 22 thereby clamps pulley 1 on shaft 35 while simultaneously maintaining inner and outer hub disc assembly 2 and 3 in a selected fixed pulley pitch position for receiving a V-belt 37 between the marginal portions of disc surfaces 9 and 25 (FIG. 7). In order to vary the pitch of pulley 1, setscrew 22 is merely retracted out of engagement with shaft 35 and slot 14 enabling hub assemblies 2 and 3 to be rotated with respect to each other until the desired disc spacing is achieved. Setscrew 22 then is tightened against shaft 35 after passing through an aligned slot 14. A maximum of one-half rotation of 90° of either hub assembly is sufficient to align setscrew 22 with a slot 14 once the desired pitch is achieved. This small angular movement, depending on the thread pitch, will have negligible effect on the newly selected pulley pitch.

The particular pulley components shown in the drawings and described above may be modified without affecting the concept of the invention. For example, the hubs may be formed from larger diameter stock eliminating the reinforcing backup washers 6 and 15. Likewise, washers 6 and 15 may be in recessed areas formed in the pulley discs or mounted on the inner disc surfaces instead of on the outer disc surfaces as shown and described.

Slots 14 may be replaced with one or more radially extending openings (threaded or unthreaded) in order to permit alignment with setscrew 22 and permit the simultaneous engagement with shaft 35. Threaded area 12 of inner hub 5 also may extend along the entire length of the extended hub end 13 with slots 14 or other opening means being formed in this threaded area. Other types of fastening or clamping means than setscrew 22 could be used for the simultaneous clamping against shaft 35 and locking together of inner and outer hub assemblies 2 and 3.

However, the particular embodiment shown and described is believed to be the best arrangment of my invention known at this time but need not be so limited for the reason discussed above.

Improved pulley construction 1 has a number of advantageous features. Only a relatively minimum amount of threaded areas is required to be machined on the inner and outer hubs thereby reducing the cost of these operation. Also, since outer end 13 of inner hub 5 which projects beyond outer hub 21 is unthreaded it eliminates the heretofore troublesome exposed threaded area which was subject to damage during fabrication, shipment, storage and installation. Another advantage is the forming of radial setscrew opening 33 and slots 14 in internal and external unthreaded areas of hubs 5 and 21. Washers 6 and 15, and discs 4 and 20 are formed integrally with their respective hubs 5 and 21 by usual circular welding, brazing, staking, bonding or similar joining procedures, this reduces the use of expensive large bar stock and the subsequent machining operations heretofore required to provide sufficient strength for the final pulley construction. One of the most important features of the invention is the use of a single setscrew for the simultaneous mounting of the pulley on a shaft and the locking of the hub and disc assemblies in any selected adjusted position. Also the pulley can be placed on a shaft so that setscrew 22 is on the outer end of the shaft, as shown in FIG. 7, to provide easy access thereto.

Accordingly, the improved adjustable pulley provides a construction which is effective, safe, inexpensive and efficient in assembly, operation and use, and which achieves all the enumerated objective, provides for eliminating difficulties encountered with prior pulley constructions, solves problems and obtains new results in the art. The improved fixed position, variable pitch pulley construction is now set forth in the appended claims.

I claim:
1. Variable pitch pulley construction including:
 (a) first and second disc means having spaced, outwardly extending complementary belt-engaging surfaces;
 (b) inner hub means mounted on and extending concentrically from the first disc means, said first disc means and inner hub means being formed with a shaft-receiving bore;
 (c) the inner hub means having an externally threaded portion located adjacent the first disc means and an unthreaded outer end portion;
 (d) longitudinally extending slot means formed in the unthreaded outer end portion of the inner hub means and communicating with the bore of said inner hub means;
 (e) outer hub means mounted on an extending concentrically from the second disc means, said second disc means and outer hub means being formed with a bore axially aligned with the bore of the first disc means and inner hub means;
 (f) the outer hub means bore having an internally threaded portion and an internally unthreaded portion;
 (g) a radially extending threaded opening formed in the outer hub means and communicating with the unthreaded portion of the outer hub means bore;
 (h) single set screw means adjustably mounted in the radially extending threaded opening of the outer hub means;
 (i) the internally threaded portion of the outer hub means bore being engaged with the externally threaded portion of the inner hub means to adjustably mount the second disc means on the inner hub means of the first disc means for selectively spacing the belt engaging surfaces of the first and second disc means with respect to each other, said radially extending threaded opening of the outer hub means being adapted to be in radial alignment with the slot means of the inner hub means when the disc means are in an adjusted position;
 (j) the set screw means extending through the aligned radial opening and slot means of the outer and inner hub means and into the bore of the inner hub means for engaging a shaft extending through said inner hub means bore to mount the pulley construction on said shaft while simultaneously operatively engaging the inner hub means to prevent relative rotation between the adjusted inner and outer hub means; and
 (k) the unthreaded outer end of the inner hub means forming a slip fit telescopic engagement with the unthreaded portion of the outer hub means bore.

2. The pulley construction defined in claim 1 in which the longitudinally extending slot means is a pair of diametrically opposed slots extending from an open end of the unthreaded outer end portion adjacent to the externally threaded portion.

3. The pulley construction defined in claim 1 in which the unthreaded portion of the outer hub means bore includes an annular recess and an annular end flange; and in which said end flange forms the slip-fit telescopic engagement with the unthreaded outer end of the inner hub means.

4. The pulley construction defined in claim 1 in which the inner hub means includes a second unthreaded end portion opposite said unthreaded outer end portion formed with the slot means; in which the first disc means is telescopically mounted on said second unthreaded end portion; and in which washer means is telescopically mounted on said second unthreaded end portion in abutting clamping engagement with the first disc means.

5. The pulley construction defined in claim 1 in which the outer hub means has first and second cylindrical outer surfaces with said first surface having a smaller diameter than said second surface.

6. The pulley construction defined in claim 5 in which the second disc means is telescopically mounted on the first cylindrical outer surface; and in which the radially extending threaded opening is formed through the second cylindrical outer surface.

* * * * *